United States Patent Office 3,373,688
Patented Mar. 19, 1968

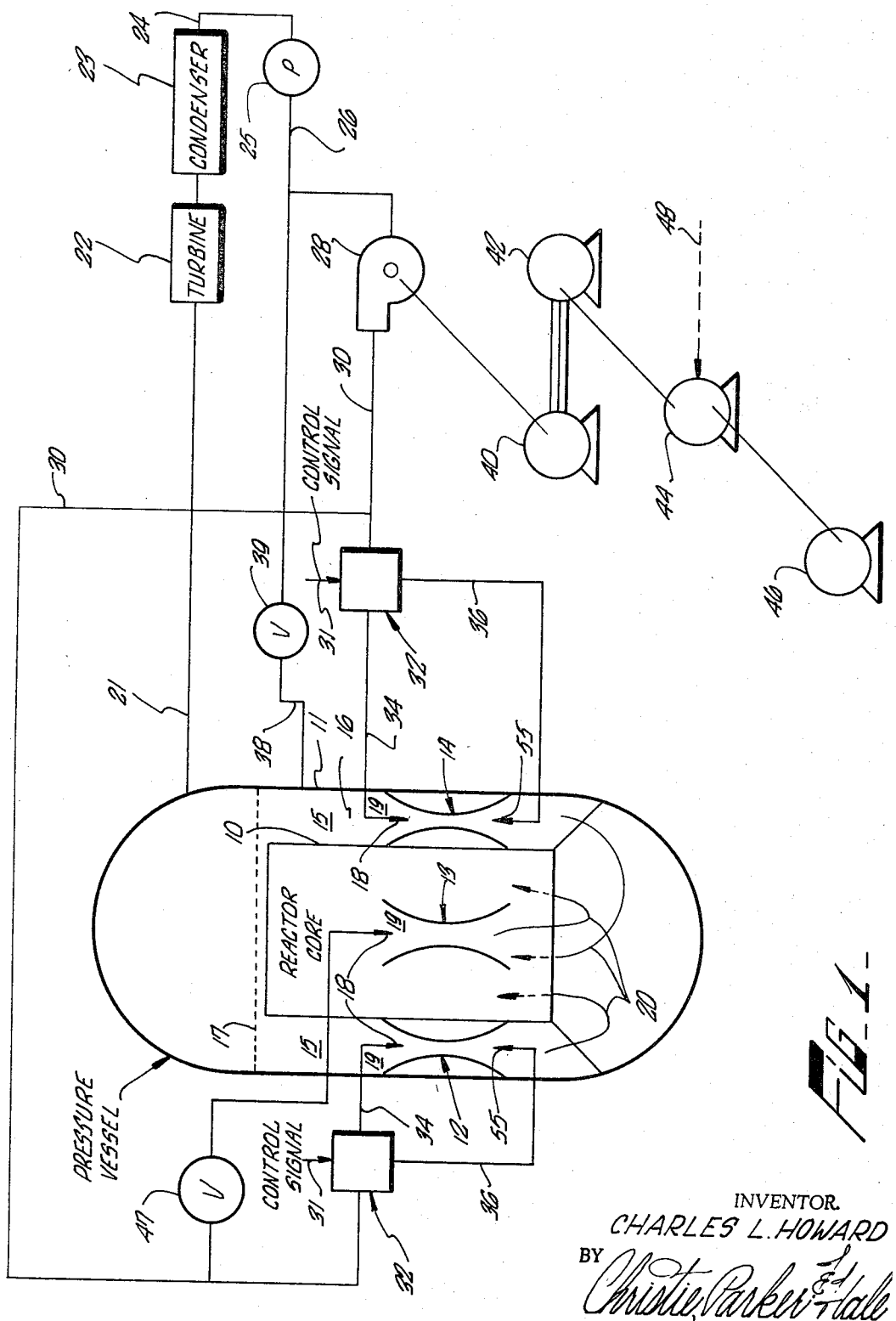

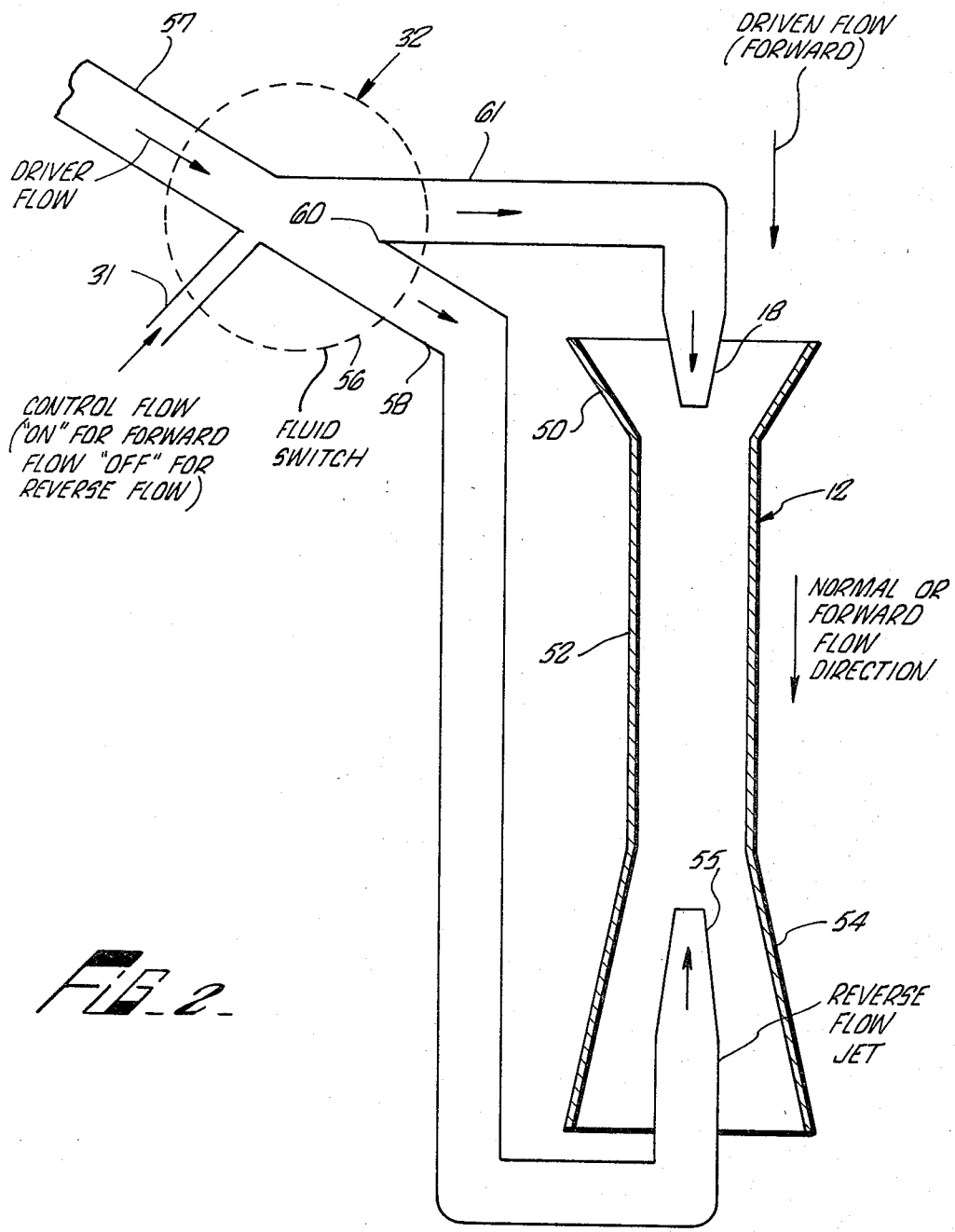

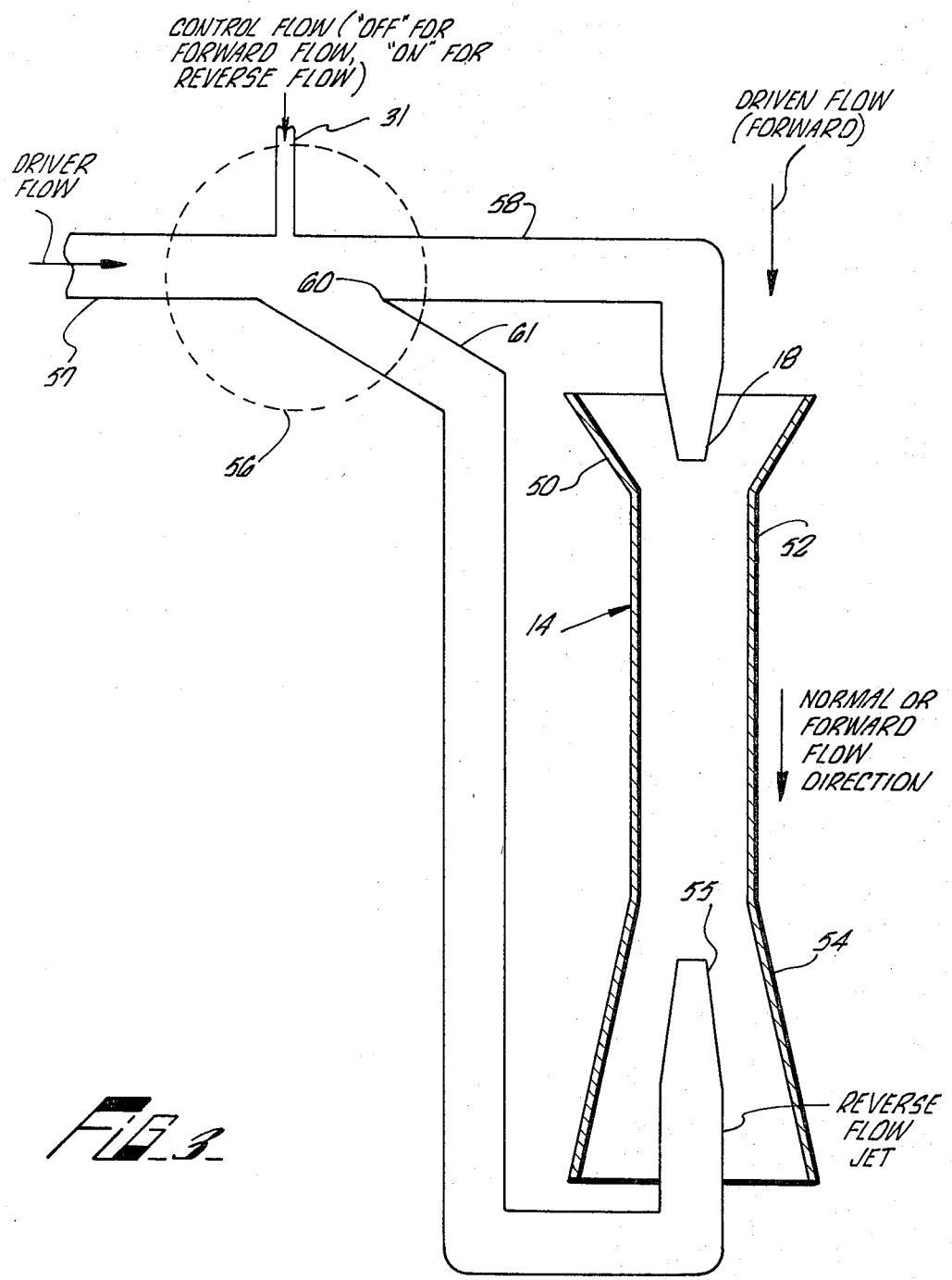

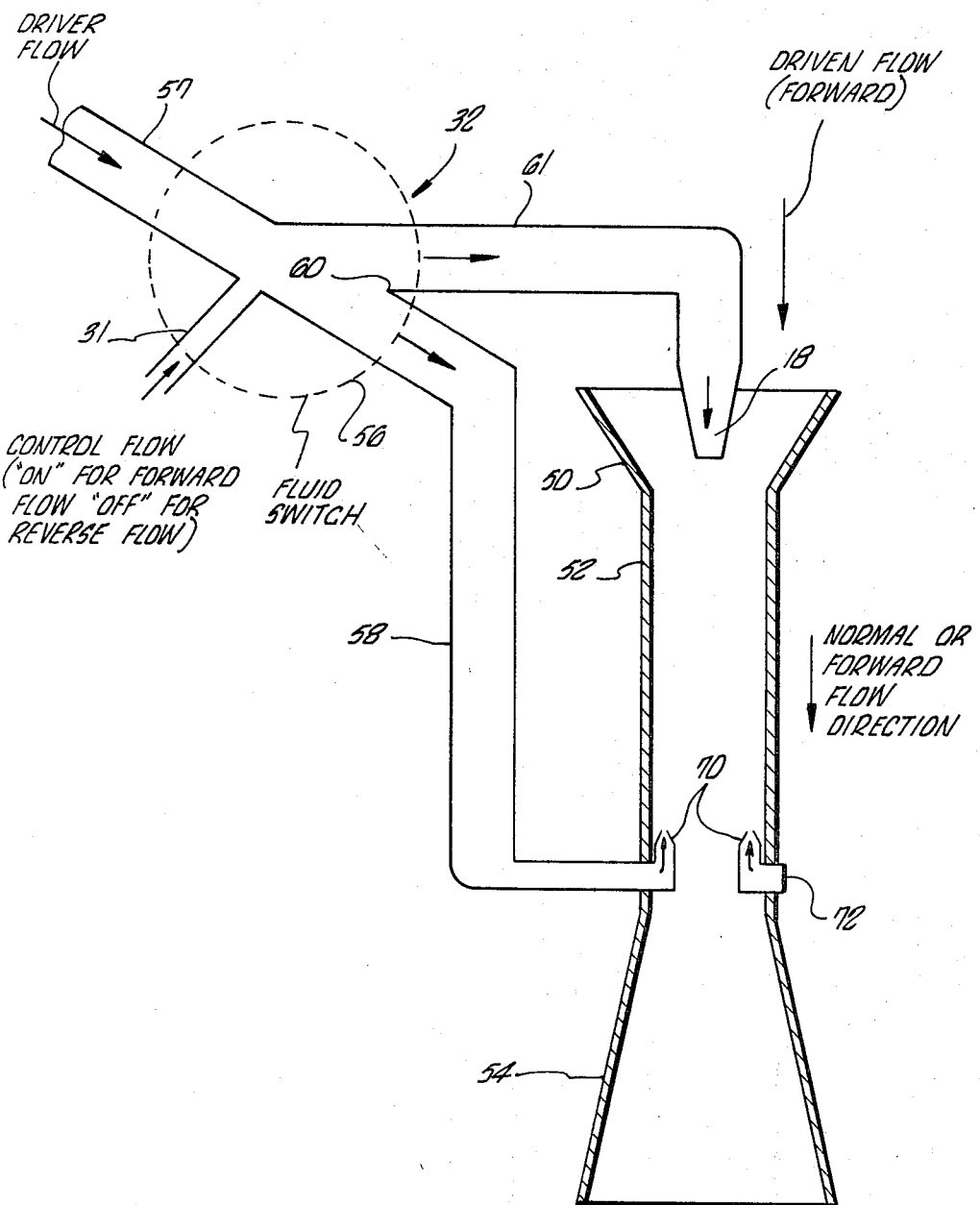

3,373,688
PUMPS
Charles L. Howard, San Jose, Calif., assignor to General Electric Company, New York, N.Y., a corporation of New York
Filed July 30, 1965, Ser. No. 476,108
6 Claims. (Cl. 103—3)

ABSTRACT OF THE DISCLOSURE

This discloses an improved jet pump capable of controllable reverse flow and in which the pump body is provided with at least one auxiliary driving fluid jet adapted to permit a controllable flow through the pump in the reverse direction from normal flow.

---

This invention relates to jet pumps and improved controls for them.

This invention can be used in a wide variety of applications, but it is ideally suited for controlling jet pumps used to circulate fluid coolant in broiling nuclear reactors, and is particularly described for that use. A boiling nuclear reactor usually includes a reactor pressure vessel with a nuclear reactor core located inside it. A fluid coolant surrounds the core, and a control system is mounted to be moved into and out of the core to control the rate of nuclear reaction, which in turn controls the rate of heat generation.

In a heterogeneous reactor, which is the type described here, the fluid coolant is liquid, and at least a portion of it is converted into vapor within the reactor core. The coolant, in addition to absorbing heat from the core, also acts as a moderator because it slows down neutrons produced by the nuclear reaction and regulates the rate of fission within the core.

A typical coolant may be light water, heavy water, or an organic liquid such as diphenyl, or any other fluid having suitable physical characteristics as both a moderator and a coolant. In a typical boiling nuclear reactor, vapor generated in the reactor core is caused to flow from the reactor vessel to a prime mover, such as a steam turbine. Vapor passing through the turbine is condensed to liquid and returned to the pressure vessel.

For a more complete discussion of boiling reactors, see Boiling Water Reactors by Kraemer, published by Addison-Wesley Publishing Company.

In the reactor core of a boiling reactor, the moderating coolant is present in both a liquid and a vapor phase. The moderator-to-fuel ratio in a reactor determines nuclear reactivity, and the tolerable range of the ratio is set by the reactor design. The boiling, moderating coolant has a number of vapor bubbles dispersed in it. The ratio of the vapor bubbles to the liquid-state coolant is the void fraction of the coolant. The moderator-to-fuel ratio is decreased as boiling increases because the vapor bubbles have a density much less than the liquid state of the moderator coolant.

In a reactor design of this type, the magnitude of the coolant flow is important with respect to the reactor power level variation as well as adequate fuel cooling. For example, a controlled decrease in flow rate increases the number of voids, decreases the neutron moderator content, and thus decreases the reactor power level. On the other hand, a controlled increase in flow rate decreases the number of voids, increases the neutron moderator content, and thus increases the reactor power level. The reactor can be designed to accomplish these power and flow variations while still providing adequate reactor fuel cooling.

Jet pumps have been mounted within the pressure vessel to provide controlled circulation of moderator coolant through the core. The jet pumps do a good job because they are relatively inexpensive, and have no moving parts.

A conventional jet pump includes a body with three distinct regions, namely, an inlet or suction section, a throat or a mixing chamber of substantially uniform cross-sectional area throughout its length, and a diffuser which increases in cross-sectional area in the direction of flow. A nozzle is positioned in the inlet section to convert a high-pressure stream of driving fluid into a high-velocity, low-pressure jet of driving fluid which flows coaxially through the inlet section and into the mixing chamber. The high-velocity jet is at a much lower pressure than fluid surrounding the nozzle in the vicinity of the inlet section so driven fluid is sucked into the pump inlet by the jet. A converging housing on the inlet section and surrounding the nozzle directs the driven fluid or suction flow into the mixing chamber. Within the mixing chamber, the high-velocity jet of driving fluid gradually widens as an entrainment-mixing process takes place with the driven fluid or suction stream. The mixing transfers momentum from the jet driving stream to the driven suction stream, so pressure in the combined stream rises. In theory, the mixing chamber ends after a uniform velocity profile is achieved, and this usually occurs shortly after the widening driving jet stream touches the mixing chamber walls. From the relatively small cross-sectional area mixing chamber, the merged driving and driven fluids flow into the diffuser of increasing cross section in the direction of flow, further increasing pump discharge pressure as the velocity of the merged fluids is reduced to extract the optimum amount of energy from the stream.

One of the advantages of jet pumps in boiling nuclear reactors is that the pumps have excellent natural circulation characteristics. Even when the driving fluid is turned off at the nozzle, there is still a substantial amount of flow through the jet pumps because of convection currents generated in the pressure vessel due to the heat in the core. However, this flow characteristic limits the control that can be exercised with conventional jet pumps installed in boiling nuclear reactors.

Prior to this invention, conventional jet pumps could be controlled only between about 40% to 100% of total flow. In other words, even with the jet pumps turned off, their good natural circulation characteristics still permit liquid to flow through the pumps at a rate equal to about 40% of the full capacity of the pump. This invention provides an auxiliary "reverse-flow" nozzle for a jet pump so that the range of its control is increased from 100% forward flow to 100% backward flow.

When using jet pumps in a nuclear reactor, or other applications, it is desirable to be able to control the flow rate of the jet pumps smoothly through a wide range. By sequential flow reversal of several jet pumps out of a total of perhaps twenty in a reactor, the total fluid-flow through the reactor core can be changed to any value from the maximum down to zero.

The improved jet pump of this invention includes an elongated, hollow pump body having an inlet and an outlet. The pump body includes a mixing chamber and a diffuser connected in series. The mixing chamber opens at one end to the pump inlet, and the diffuser opens at one end to the pump outlet. A forward-flow nozzle is mounted adjacent the pump inlet to direct a jet of driving fluid into the mixing chamber and toward the pump outlet. A reverse-flow nozzle is mounted adjacent the pump outlet to direct a jet of fluid into the pump body toward the pump inlet.

In the preferred form of the invention, a source of fluid pressure is connected to both the forward-flow and reverse-flow nozzles in the pump, and control means are provided for varying the amount of fluid delivered to the nozzles. Preferably, the control means is a fluid switch which is energized or de-energized by the application or removal of control fluid pressure to the switch.

When one or more of the pumps of this invention are used in a jet pumping system for a pressure vessel, such as a nuclear reactor including a reactor core, the pumps are mounted inside the pressure vessel to have their inlets connected to a core outlet and their outlets connected to a core inlet. Preferably, the fluid switch is located outside the pressure vessel to facilitate control and maintenance of the fluid through the jet pumps within the vessel.

Preferably, the reverse-flow jets are controlled independently of each other so that the pumps can be actuated sequentially to flow in the reverse direction and provide a wide range of flow variation through the reactor core in the pressure vessel.

For maximum safety, the pumps are arranged to "fail-safe," i.e., prevent overheating or too rapid a reactivity increase by using a plurality of jet pumps, some of which are equipped with reverse-flow jets and others of which are not. A portion of those pumps equipped with reverse-flow jets flow in a forward direction when their respective fluid switches are energized, and the others flow in a forward direction when their switches are de-energized. The remaining jet pumps, which have no reverse-flow nozzles, flow in a forward direction independently of the condition of any of the fluid switches. In this way, even though control fluid pressure is lost to all fluid switches, an intermediate fluid flow rate is automatically established through the core to provide a safe operating condition.

These and other aspects of the invention will be more fully understood from the following detailed description and the accompanying drawings, in which:

FIG. 1 is a schematic elevation of jet pumps with and without reverse-flow nozzles mounted in a boiling nuclear reactor in accordance with this invention;

FIG. 2 is an enlarged schematic drawing showing how a fluid switch is used to control the flow of driving fluid to a jet pump which automatically pumps in a reverse direction if control pressure for the fluid switch fails;

FIG. 3 is an enlarged schematic drawing showing how a fluid switch is used to control the driving fluid of a jet pump which automatically operates in the forward direction if control fluid to the fluid switch fails; and FIG. 4 is an enlarged schematic drawing showing a plurality of reverse-flow nozzles mounted around the periphery of the mixing chamber for reversing fluid-flow through the pump.

Referring to FIG. 1, a cylindrical reactor core 10 is coaxially disposed within a cylindrical pressure vessel 11 closed at its top and bottom. A plurality of jet pumps 12, 13, and 14 are mounted in an annular downcomer space 15 formed between the reactor core and the wall of the pressure vessel.

A pool of water 16 is maintained at an operating level 17 above the height of the upper end of the reactor core. A separate forward-flow nozzle 18 is mounted adjacent the inlet 19 of each jet pump to direct a jet of high-velocity liquid down through the pump body, thus sucking driven fluid through the pump with it. The mixed driving and driven fluids are forced into the bottom of the reactor core as indicated by arrows 20 and flow up through the reactor core where at least part of the water is converted to steam, which flows from the pressure vessel through a steam line 21 into a turbine 22. Steam passing through the turbine is condensed in a condenser 23 and returned as feedwater through a line 24 to a first pump 25 having its inlet connected by a line 26 to the inlet of a driving pump 28 which is connected to a high pressure supply line 30 and a plurality of control systems 32 which are each connected to a respective nozzle 18 by a driving fluid line 34. A separate fluid control line 31 is connected to each control system 32 for controlling the flow of fluid as described in detail below.

A separate reverse-flow line 36 is connected at one end to each control system 32 and is sealed through the wall of the pressure vessel and terminates in a respective reverse-flow nozzle mounted downstream of the forward-flow nozzle serving the pump.

The control system and jet pumps are described in more detail below with respect to FIG. 2. Additional driving fluid is taken as required from the pool of water through line 38 connected to the suction side of pump 28. A valve 39 in line 38 controls the flow of fluid through the line.

In automatic control systems, the speed of pump 28 is controlled by a motor 40 which is supplied power from a variable-frequency generator 42. The generator is driven by a variable fluid coupler 44, which in turn is driven by a prime motor 46 connected to it. A control 48 on the variable fluid coupler determines the amount of power delivered by the prime motor 46 and the rate at which the variable-frequency generator is turned. This in turn controls the speed of motor 40 and pump 28. This rather elaborate and expensive system has been required in the past to control the flow of fluid through the jet pumps, but in many installations can be eliminated by the use of reverse-flow nozzles in accordance with this invention.

At least one of the jet pumps (pump 13 shown in FIG. 1) is mounted in the annular space 15 in the pressure vessel without a reverse-flow nozzle. Pump 13 receives driving fluid through line 30 and can pump only in the forward direction, unless turned off by operation of a valve 47 in line 30. Although only three jet pumps are shown in FIG. 1, any desired number can be used. For example, twenty pumps may be employed. Twelve of the pumps have no fluid switches or reverse-flow jets. The remaining eight have flow switches and reverse-flow jets connected to operate as described in detail below.

Referring to FIG. 2, jet pump 12 includes a frusto-conical inlet section 50 connected at its smaller end to the upstream end of an elongated, cylindrical throat or mixing chamber 52. The wider end of the inlet section opens toward the forward-flow nozzle 18, which is collinear with the longitudinal axis of the mixing chamber.

The opposite or downstream end of the mixing chamber is connected to the smaller end of frusto-conical diffuser 54 which discharges at its lower end into the underside or inlet of the reactor core shown in FIG. 1.

The control device 32 can be any suitable unit which can divert all or part of the driving fluid from the nozzle 18 to a reverse-flow nozzle 55 mounted in the diffuser collinear with the mixing chamber longitudinal axis to direct a jet of fluid from the pump outlet to the pump inlet. A fluid switch 56 makes an ideal control system for switching driving fluid between the forward-flow nozzle and the reverse-flow nozzle.

Fluid switches are described in detail in Scientific American, December 1964, pp. 80–88.

A prime advantage of this invention is that the control system is outside the pressure vessel, and no moving parts are required within the vessel to achieve the increased recirculation flow range. In some installations, the improved control eliminates the necessity of the variable-power generator 42, variable fluid coupler 44, and prime motor 46. In these cases, the feedwater pump 28 can always be operated at rated speed, and the energy addition to the recirculation flow is controlled by the flow spoiler system. Of course, the spoiler technique of this invention can also be used to control fluid-flow through jet pumps even when feedwater is not introduced through the jet pump nozzles.

Driving fluid from high-pressure supply line 30 enters an inlet 57 of the fluid switch, and normally would flow straight through the control device and out a first outlet 58 connected to the reverse-flow nozzle 55. However, a small stream of control liquid under pressure is injected through control line 31 just upstream of a pointed stream splitter 60 formed where first outlet 58 and a second outlet 61 leave the fluid switch. Second outlet 61 is connected to the forward-flow nozzle 18. The control stream is directed against the right (as viewed in FIG. 2) side of the main flow of driving fluid, and diverts it to the left so that all of the driving fluid flows out the second outlet 61. In this condition, the pump is full-on because all of the driving fluid flows out forward-flow nozzle 18 and into the mixing chamber of the jet pump. To reverse the pumping direction, the control stream is turned off so the driving fluid now flows straight through the switch and out the first outlet 58 to the reverse-flow nozzle 55 to drive fluid through the pump in the opposite direction. By adjusting the strength or pressure of the control stream, the amount of fluid flowing through the reverse-flow nozzle is varied from zero to 100% of the volume of the fluid passing through the fluid switch. Thus, not only can the pump be turned off, but it can be made to pump in the reverse direction, completely overcoming the natural circulation which would flow through the pump if the reverse-flow nozzle were absent. Moreover, if control fluid pressure should fail, pump 12 will automatically pump in the reverse direction.

Pump 14 shown in FIG. 3 is identical with that of the pump shown in FIG. 2 except the fluid switch 56 is connected to pump 14 so that if the fluid control pressure fails, pump 14 will automatically pump in a forward direction.

In the pump shown in FIG. 3, driving fluid enters the fluid switch inlet 57 from high-pressure supply line 30 and passes straight through the switch and out first outlet 58 connected to the forward-flow nozzle 18. Ordinarily, no control fluid pressure is applied through line 31, so that the pump operates in the forward direction. To reverse the pump, a stream of control liquid is injected under pressure through control signal line 31 just upstream of the pointed stream splitter on the left side of the driving fluid to shift the driving fluid to the right and out the second outlet 61, which is connected to the reverse-flow nozzle 55. Under this condition, pump 14 is operated in the reverse direction. By adjusting the strength and pressure of the control stream, the amount of fluid flowing through the reverse-flow nozzle is adjusted from zero to 100% of the fluid volume passing through the fluid switch.

Control of the total fluid-flow through the reactor core is achieved by independent and sequential control of the individual jet pumps. For example, starting from maximum forward flow for all jet pumps, the sequence for flow reduction is as follows; assuming a total of twenty jet pumps:

(1) Reduce gradually the forward flow in jet pump No. 1 until its flow is maximum in the reverse direction. The total core flow is (as a first approximation) reduced to $18/20$ of its original value.

(2) Reduce gradually the flow in a second jet pump (preferably located on the opposite side of the reactor from the first) until its flow is a maximum in the reverse direction. The core flow is now roughly $16/20$, or less, of the original value.

(3) From the foregoing, it is seen that the core flow can be reduced to zero by reversing the flow in about one-half of the jet pumps. It is, therefore, necessary to provide flow-reversing jets on less than one-half of the jet pumps. For example, the reversing jets are provided on every second or third jet pump.

An important safety aspect of this invention is the ability to provide for the inadvertent loss of flow to the control lines of the fluid switches. If such loss occurs, it is desired that the system be "fail-safe."

The meaning of "fail-safe" in this system is not immediately obvious. The required considerations include the following:

(1) When the reactor is at a low core flow condition, it is important that failure of a fluid switch control line not result in a sudden increase of reactor flow rate. If such a flow increase were too rapid (relative to fuel time constant), the decrease in core voids could result in too rapid a reactivity increase. With this consideration in mind, flow rate through the core must not increase too fast in the event of failure of control lines to the fluid switches.

(2) When the reactor is operated with higher fluid flow rates through the core, it is important that failure of the fluid switch control lines does not result in too rapid a decrease in core flow, so that the critical heat flux limit for the fuel is reached during the flow transient. In order to be "fail-safe" in this event, adequate flow should continue through the core when no control flow is applied to the fluid switches.

(3) The requirements of both (1) and (2) immediately above are satisfactorily met by using a combination system which solves the advantages of both items (1) and (2) above.

For example, a reactor having twenty jet pumps is arranged to have fluid switch controls as follows:

| Type of fluid switch control: | No. of jet pumps |
|---|---|
| No fluid switches or reverse-flow jets | 12 |
| Fluid switch directs flow to "forward-flow jet" if control flow is lost (FIG. 3) | 4 |
| Fluid switch directs flow to "reverse-flow jet" if control flow is lost (FIG. 2) | 4 |

With this arrangement, if the control flow of all the fluid switches is lost, the reactor flow comes to an equilibrium condition that is safe. The sixteen jet pumps supplying forward-flow and four supplying reverse-flow give a total reactor core flow of approximately $12/20$ or 60% of the maximum flow rate. Choice of this equilibrium flow rate results in a relatively small transient when starting from either high flow or low flow conditions. The exact number of jet pumps with each control arrangement is adjusted to account for design requirements for a particular application and for the forward-to-reverse flow capacity ratio of particular jet pump designs. It is also necessary to consider the sequencing for normal flow reversal of the jet pumps of the two control arrangements so that the flow transients are acceptable regardless of the reactor flow at the start of the transient.

The advantages of pumping systems made in accordance with this invention include the following:

(1) It provides a wide range of carefully controlled flow variation through a reactor core.

(2) It maintains flow stability or "stiffness" at low flow rates.

(3) The control devices are simple, reliable, and have a long life. They are particularly well suited for nuclear reactor installation because they do not use any moving parts.

(4) The system reduces flow through jet pumps well below the natural circulation levels, and in fact can reverse the direction of flow through the pumps.

FIG. 4 shows an alternate embodiment of a pump which is similar to that shown in FIG. 2, except that a plurality of reversing nozzles 70 are disposed in an annular configuration inside the discharge end of the mixing chamber and coaxially in the mixing chamber. Reversing fluid is supplied to the reverse-flow nozzles from the first outlet 58 of the fluid switch 56. The outlet 58 is connected to a manifold 72 which supplies liquid to all of the reverse-flow nozzles. The remainder of the pump is identical with that shown in FIG. 2, and a detailed description of the elements is not repeated here for brevity.

I claim:

1. A jet pump comprising an elongated, hollow body having an inlet and an outlet, the body including a mixing chamber and diffuser connected in series, the mixing chamber opening at one end to the pump inlet, and the diffuser opening at one end to the pump outlet, a forward-flow nozzle mounted adjacent the pump inlet to direct a jet into the mixing chamber and toward the pump outlet, and a reverse-flow nozzle mounted adjacent the pump outlet to direct a jet into the pump body toward the pump inlet.

2. A jet pump comprising an elongated, hollow body having an inlet and an outlet, the body including a mixing chamber and diffuser connected in series, the mixing chamber opening at one end to the pump inlet, and the diffuser opening at one end to the pump outlet, a forward-flow nozzle mounted adjacent the pump inlet to direct a jet into the mixing chamber and toward the pump outlet, a reverse-flow nozzle mounted adjacent the pump outlet to direct a jet into the pump body toward the pump inlet, a source of fluid pressure connected to the nozzles, and control means for varying the amount of fluid delivered to the nozzles.

3. A jet pump comprising an elongated, hollow body having an inlet and an outlet, the body including a mixing chamber and diffuser connected in series, the mixing chamber opening at one end to the pump inlet, and the diffuser opening at one end to the pump outlet, a forward-flow nozzle mounted adjacent the pump inlet to direct a jet into the mixing chamber and toward the pump outlet, a reverse-flow nozzle mounted adjacent the pump outlet to direct a jet into the pump body toward the pump inlet, a source of fluid pressure, a line connected to the nozzles and the source, and control means in the line for diverting flow of fluid from one nozzle to another.

4. A jet pump comprising an elongated, hollow body having an inlet and an outlet, the body including a mixing chamber and diffuser connected in series, the mixing chamber opening at one end to the pump inlet, and the diffuser opening at one end to the pump outlet, a forward-flow nozzle mounted adjacent the pump inlet to direct a jet into the mixing chamber and toward the pump outlet, a reverse-flow nozzle mounted adjacent the pump outlet to direct a jet into the pump body toward the pump inlet, a source of fluid pressure, a fluid switch having an inlet and two outlets, means connecting the fluid switch inlet to the source, means connecting one of the fluid switch outlets to one of the nozzles, means connecting the other fluid switch outlet to the other nozzle, and control means for the fluid switch to regulate the amount of fluid delivered from the source of the nozzles.

5. A jet pump comprising an elongated, hollow body having an inlet and an outlet, the body including a mixing chamber and diffuser connected in series, the mixing chamber opening at one end to the pump inlet, and the diffuser opening at one end to the pump outlet, a forward-flow nozzle mounted adjacent the pump inlet to direct a jet into the mixing chamber and toward the pump outlet, and a reverse-flow nozzle mounted in the mixing chamber to direct a jet into the pump body toward the pump inlet.

6. A jet pump comprising an elongated, hollow body having an inlet and an outlet, the body including a mixing chamber and diffuser connected in series, the mixing chamber opening at one end to the pump inlet, and the diffuser opening at one end to the pump outlet, a forward-flow nozzle mounted adjacent the pump inlet to direct a jet into the mixing chamber and toward the pump outlet, and a plurality of reverse-flow nozzles mounted in the mixing chamber and at its periphery to direct jets of fluid into the pump body toward the pump inlet.

References Cited

UNITED STATES PATENTS

| 49,603 | 8/1865 | Chappell | 103—3 |
| 1,409,441 | 3/1922 | Harper | 103—3 |
| 2,722,895 | 11/1955 | De Porter | 103—5 |

FOREIGN PATENTS

| 896,302 | 11/1944 | Germany. |

DONLEY J. STOCKING, *Primary Examiner.*

W. J. KRAUSS, *Assistant Examiner.*